(12) United States Patent
Zadorojniy et al.

(10) Patent No.: US 12,346,777 B2
(45) Date of Patent: Jul. 1, 2025

(54) OPTIMIZING A MACHINE FOR SOLVING OFFLINE OPTIMIZATION PROBLEMS

(71) Applicant: International Business Machines Corporation, Armonk, NY (US)

(72) Inventors: Alexander Zadorojniy, Haifa (IL); Vladimir Lipets, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1063 days.

(21) Appl. No.: 17/032,142

(22) Filed: Sep. 25, 2020

(65) Prior Publication Data

US 2022/0101177 A1    Mar. 31, 2022

(51) Int. Cl.
*G06N 20/00* (2019.01)
*G06N 5/01* (2023.01)
*G06N 5/04* (2023.01)
*G06N 7/01* (2023.01)

(52) U.S. Cl.
CPC .............. *G06N 20/00* (2019.01); *G06N 5/04* (2013.01)

(58) Field of Classification Search
CPC ................................. G06N 20/00; G06N 5/04
See application file for complete search history.

(56) References Cited

U.S. PATENT DOCUMENTS

| | | | |
|---|---|---|---|
| 10,032,281 B1 * | 7/2018 | Ghesu | G16H 50/70 |
| 10,430,739 B2 | 10/2019 | Katz et al. | |
| 10,540,598 B2 | 1/2020 | Wasserkrug et al. | |
| 11,615,322 B1 * | 3/2023 | Thomas | G06N 5/00 717/145 |
| 2018/0121766 A1 * | 5/2018 | McCord | G06Q 10/06311 |
| 2019/0138948 A1 * | 5/2019 | Janulewicz | H04L 45/124 |
| 2019/0378098 A1 * | 12/2019 | Lam | G06Q 20/027 |
| 2020/0124429 A1 * | 4/2020 | Zhang | G06Q 10/047 |

(Continued)

FOREIGN PATENT DOCUMENTS

WO    2020040763 A1    2/2020

OTHER PUBLICATIONS

Fard et al., "MDPs with Non-Deterministic Policies", School of Computer Science, McGill University, NSERC Discovery Grant program, 8 pages, printed Sep. 10, 2020.

(Continued)

*Primary Examiner* — Kamran Afshar
*Assistant Examiner* — Steven Phung
(74) *Attorney, Agent, or Firm* — Jeffrey M. Ingalls

(57) ABSTRACT

A method for improving a machine operation are provided. The method includes receiving a plurality of domain specific heuristics and a set of states and a set of actions, where an immediate cost and/or reward is associated with a pair of state and action. The method also includes generating at least one of: a graph of state transitions for the actions, and a transition probability matrix. The method also includes executing a Markov Decision Process (MDP) model for solving an MDP problem, and outputting an MDP optimal policy of an optimal mapping of a given state to an action. The method also includes selecting one of the plurality of domain specific heuristics and heuristic input parameters thereof. The method also includes controlling the machine for solving a predefined optimization problem in a plurality of execution iterations.

15 Claims, 3 Drawing Sheets

(56) References Cited

U.S. PATENT DOCUMENTS

2020/0410343 A1* 12/2020 Niu .................. G06N 10/40
2021/0295176 A1* 9/2021 Jacobs ............... G06N 5/01

OTHER PUBLICATIONS

Zarpellon et al. "Parameterizing Branch-and-Bound Search Trees to Learn Branching Policies", arXiv:2002.05120v1 [cs.LG] Feb. 12, 2020, 21 pages.

Mazyavkina et al., "Reinforcement Learning for Combinatorial Optimization: A Survey", arXiv:2003.03600, latest version Aug. 15, 2020, 8 pages.

Tang et al., "Reinforcement Learning for Integer Programming: Learning to Cut", Proceedings of the 37 th International Conference on Machine Learning, Vienna, Austria, PMLR 119, 2020. Copyright 2020, 18 pages.

Bengio et al., "Machine Learning for Combinatorial Optimization: a Methodological Tour d'Horizon", arXiv:1811.06128 [cs.LG], 47 pages, last revised Mar. 12, 2020.

Khalil, "Machine Learning for Integer Programming", Proceedings of the Twenty-Fifth International Joint Conference on Artificial Intelligence (IJCAI-16), 2 pages.

Khalil et al., "Learning to Branch in Mixed Integer Programming", Proceedings of the Thirtieth AAAI Conference on Artificial Intelligence (AAAI-16), Copyright 2016, Association for the Advancement of Artificial Intelligence, 8 pages.

* cited by examiner

| Iteration | Objective function | Parameter#1 | Parameter #2 | Parameter #3 |
|---|---|---|---|---|
| 1 | x | 0 | 3 | 0.2 |
| 2 | x+y | 1 | 2 | 0.3 |
| 3 | x+y+z | 2 | 1 | 0.4 |

FIG. 3

OPTIMIZING A MACHINE FOR SOLVING OFFLINE OPTIMIZATION PROBLEMS

BACKGROUND

The present disclosure, in some embodiments thereof, relates to optimization problems and, more specifically, but not exclusively, to a method and system for optimizing the operation of a machine for solving real time large scale offline optimization problems.

Markov Decision Process (MDP) is discrete-time stochastic control process. It provides a mathematical framework for modeling decision making in situations where outcomes are partly random and partly under the control of a decision maker. MDPs are useful for studying optimization problems, which are usually solved via dynamic programming and/or reinforcement learning (RL).

SUMMARY

The present disclosure describes systems, a methods, and computer program products for operating a machine for solving a predefined optimization problem.

In certain embodiments, a computerized implemented method for improving a machine operation is provided. The method includes receiving a plurality of domain specific heuristics and a set of states and a set of actions, where an immediate cost and/or reward is associated with a pair of state and action. The method also includes generating at least one of: a graph of state transitions for the actions, and a transition probability matrix. The method also includes executing a Markov Decision Process (MDP) model for solving an MDP problem, and outputting an MDP optimal policy of an optimal mapping of a given state to an action. The method also includes selecting one of the plurality of domain specific heuristics and heuristic input parameters thereof. The method also includes controlling the machine for solving a predefined optimization problem in a plurality of execution iterations. Each execution iteration includes: using the outputted MDP action for a current state which may include the selected domain specific heuristic and the heuristic input parameters; receiving a result for the optimization problem and calculating a next state; upon the MDP model determining that a predefined stopping condition is met, stopping the execution of the iterations of the machine for solving the predefined optimization problem; upon the MDP model determining that the predefined stopping has not been met, inputting the next state to the MDP model to receive an optimal action for the next state for the next iteration of the machine for solving the predefined optimization problem.

In certain embodiments, a system for improving a machine operation is provided. The system includes one or more computer readable storage media with program instructions collectively stored on the one or more computer readable storage media; and one or more processors configured to execute the program instructions to perform a method. The method includes receiving a plurality of domain specific heuristics and a set of pairs of states and actions, where an immediate cost and/or reward is associated with each pair of states and actions. The method also includes generating at least one of: a graph of state transitions for the actions, and a transition probability matrix. The method also includes executing a Markov Decision Process (MDP) model for solving an MDP problem, and outputting an MDP optimal policy of an optimal mapping of a given state to an action. The method also includes selecting one of the plurality of domain specific heuristics and heuristic input parameters thereof. The method also includes controlling the machine for solving a predefined optimization problem in a plurality of execution iterations. Each execution iteration includes: using the outputted MDP action for a current state which may include the selected domain specific heuristic and the heuristic input parameters; upon the MDP model determining that a predefined stopping condition is met, stopping the execution of the iterations of the machine for solving the predefined optimization problem; upon the MDP model determining that the predefined stopping has not been met, inputting the next state to the MDP model to receive an optimal action for the next state for the next iteration of the machine for solving the predefined optimization problem.

In certain embodiments, a computer program product for improving a machine operation is provided. The computer program product comprises: one or more computer readable storage media, and program instructions collectively stored on the one or more computer readable storage media. The program instructions include program instructions to receive a plurality of domain specific heuristics and a set of pairs of states and actions, where an immediate cost and/or reward is associated with each pair of states and actions. The program instructions include program instructions to generate at least one of: a graph of state transitions for the actions, and a transition probability matrix. The program instructions include program instructions to execute a Markov Decision Process (MDP) model for solving an MDP problem, and outputting an MDP optimal policy of an optimal mapping of a given state to an action. The program instructions include program instructions to select one of the plurality of domain specific heuristics and heuristic input parameters thereof based on outcomes of a previous iteration. The program instructions include program instructions to control the machine for solving a predefined optimization problem in a plurality of execution iterations. Each execution iteration includes: using the outputted MDP action for a current state which may include the selected domain specific heuristic and the heuristic input parameters; receiving a result for the optimization problem and calculating a next state; upon the MDP model determining that a predefined stopping condition is met, stopping the execution of the iterations of the machine for solving the predefined optimization problem; upon the MDP model determining that the predefined stopping has not been met, inputting the next state to the MDP model to receive an optimal action for the next state for the next iteration of the machine for solving the predefined optimization problem.

In certain embodiments, the domain specific heuristics and the input parameters thereof are defined as actions in the action space.

In certain embodiments, a separate MDP model is executed for each domain specific heuristic and the heuristic input parameters.

In certain embodiments, the state transitions per actions is generated by a simulation executed by a processor.

In certain embodiments, the state transitions per actions is generated from a set of real data received as input records.

In certain embodiments, the stopping condition is one of the following: a predefined number of iterations; no change in a predefined objective function for a predefined number of iterations; and no change in one or more input parameters of the selected domain specific heuristic for a predefined number of iterations.

In certain embodiments, the method further comprises: receiving data generated using the MDP optimal policy for pre-training a Reinforcement Learning (RL) and/or Deep RL model; executing the RL and/or DRL model outputting a recommended policy; selecting one of a plurality of domain specific heuristics and the heuristic input parameters; and controlling a machine for solving a predefined optimization problem in a plurality of execution iterations, wherein in each execution of an iteration: using the selected heuristic and the outputted RL and/or DRL recommended action for a current state; receiving a result for the optimization problem for a next state, checking when a predefined stopping condition is met, stopping the execution of the iterations of the machine for solving the predefined optimization problem; otherwise inputting the next state to the RL and/or DRL model to receive the recommended action for the next state, for the next iteration of the machine for solving a predefined optimization problem.

In certain embodiments, the method further comprises training the RL and/or Deep RL model with data records received from a simulation results.

In a further implementation of the first and second aspects, the method further comprises training the RL and/or Deep RL model with a set of real environmental data.

In certain embodiments, a reinforcement learning (RL) and/or deep RL (DRL) model is used instead of the MDP model.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

FIG. 3 schematically shows a simplified example of a template of results received from the execution of the algorithms by a target machine executing a target computational process, which is being optimized, according to some embodiments of the present disclosure.

Figure 1:
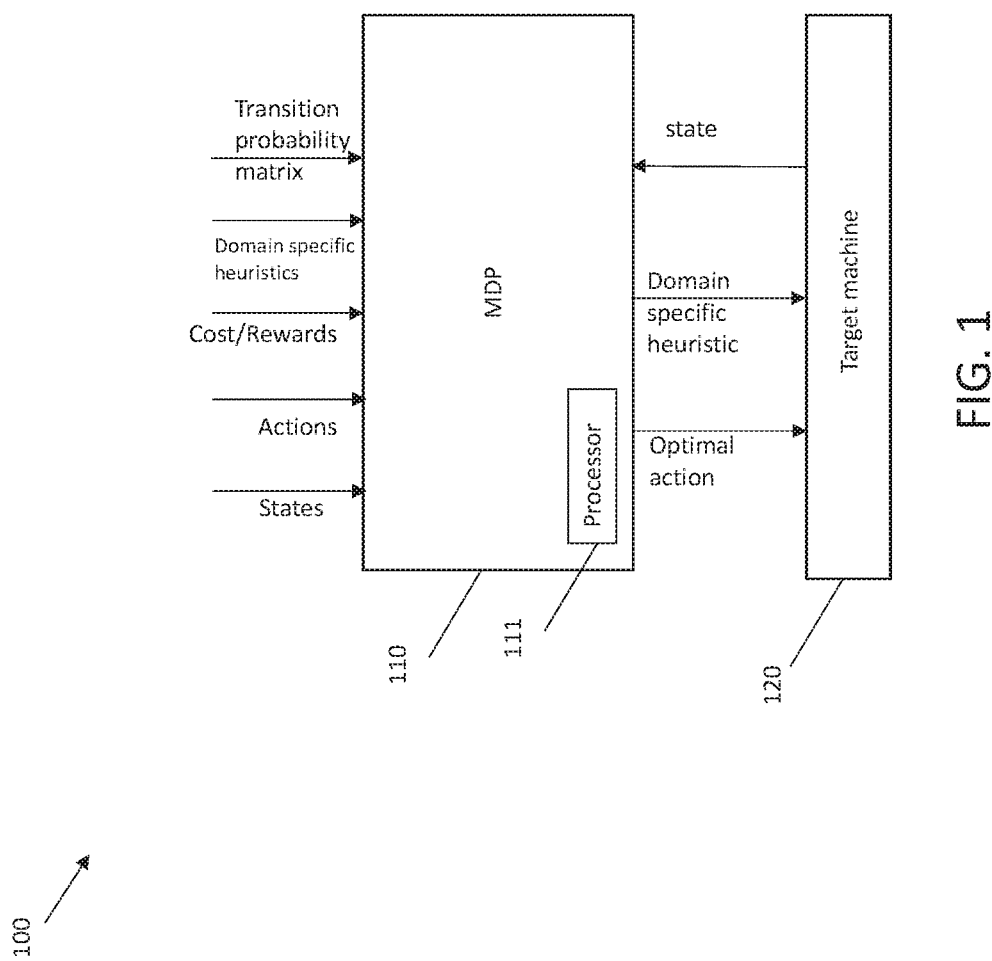
FIG. 1 schematically shows a block diagram of a system for optimizing the operation of a machine for solving real time large scale offline problems, according to some embodiments of the present disclosure.

It should be appreciated that elements in the figures are illustrated for simplicity and clarity. Well-understood elements that may be useful or necessary in a commercially feasible embodiment may not be shown for the sake of simplicity and to aid in the understanding of the illustrated embodiments.

DETAILED DESCRIPTION

The present disclosure, in some embodiments thereof, relates to optimization problems and, more specifically, but not exclusively, to a method, a system, and a computer program product for optimizing the operation of a machine for solving real time large scale offline optimization problems.

Real life problems are frequently very complicated, and may be linear or non-linear problems, such as a Mixed Integer Linear Programming (MILP) problem or Mixed Integer Programming (MIP) problem, with a large number of integer variables, or without integers at all. An air-crew scheduling problem is an example of a real life problem. In this example, the problems may include determining what type of employees should be scheduled to what flight and at what time, according to the limitations of the employees and the air-crew requirements. These problems can be described by as many as 100 million integer variables. These kind of Integer Problems (IP) cannot be solved by any modern analytic solution method directly (also referred to as a solver). Thus, optimization experts may develop domain specific heuristics to tackle the problems. This process may be manual and may rely on the domain expertise of the expert.

A heuristic technique, or a heuristic, is any approach to problem solving or self-discovery that employs a practical method that is not guaranteed to be optimal, perfect, or rational, but is nevertheless sufficient for reaching an immediate, short-term goal or approximation. Where finding that an optimal solution is impossible or impractical, heuristic methods may be used to speed up the process of finding a satisfactory solution. Heuristics are commonly used in problem solving of machines to reduce the computational power required for making a decision.

The manual process of the expert developing domain specific heuristics, may be time consuming and the results may be less than optimal. Thus, a more automatic solution may be desired. According to some embodiments of the present disclosure, a system and method are provided, which use machine-learning techniques such as Reinforcement Learning (RL), deep RL (DRL) and an MDP model to automatically manage the selection of heuristics and their input parameters, instead of manually developing the rules for heuristics and their parameters selection. According to some embodiments of the present disclosure, the system and method disclosed herein relate to a general type of optimization problems (e.g., non-linear) and even for IP problems where the heuristics used are not domain specific and normally only one type heuristics is used.

It should be appreciated that the embodiments disclosure herein are not necessarily limited in their application to the specific details of construction and the arrangement of the components and/or methods set forth in the following description and/or illustrated in the drawings and/or the Examples. The embodiments may be practiced or carried out in various ways.

The embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer and/or computerized device, partly on the user's computer and/or computerized device, as a stand-alone software package, partly on the user's computer (and/or computerized device) and partly on a remote computer or entirely on the remote computer or server. In the latter scenario, the remote computer may be connected to the user's computer and/or computerized device through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the figures, and initially to FIG. 1, this figure schematically shows a block diagram of a system 100 for optimizing the operation of a machine for solving real time large scale offline optimization problems, according to some embodiment of the present disclosure. System 100 includes, a Markov Decision Process (MDP) model 110 for solving MDP problems and a target machine 120 executing a target computational process, which is being optimized.

System 100, is adapted to solve problems formulated as MDP problems to obtain an optimal policy of an optimal mapping of a given states to an action. The MDP model is a 4-tuple (S, U, $P_a$, c), where S denotes a set of states called the state space, U denotes a set of actions called the action space, $P_u(s, s') = P_r(s_{t+1} = s' | s_t = s, u_t = u)$ denotes the probability that action u in state s at time t leads to state s' at time t+1, c(s, u) denotes the immediate cost or reward of being at state s, using action u.

The objective is to choose a policy π that maximizes some cumulative function of the random rewards, typically the expected discounted sum over a potentially infinite horizon:

$s_t$ denotes a random variable of a state in time t
$u_t$ denotes a random variable of an action in time t
Policy π denotes a function π: S×U→[0,1]
$s_0$ denotes an initial state
$C_{s_0}(\pi)$ denotes an objective function, and $$E_t^\pi[c(s_t, u_t)] = \Sigma_{s \in S, u \in U} c(s, u) P_{s_0}^\pi(s_t = s, u_t = u)$$

$$C_{s_0}(\pi) = (1-\gamma) \Sigma_{t=0}^\infty \gamma^t E_t^\pi[c(s_t, u_t)],$$

where γ denotes the discount factor satisfying 0≤γ≤1, which is usually close to 1 (for example, γ=1/(1+r) for some discount rate r). A lower discount factor motivates a decision maker (the MDP model in the case of the present disclosure) to favor of shorter terms rewards, rather than taking care about long term effects.

A policy that maximizes the function above may be called an optimal policy and is usually denoted π*. A particular MDP may have multiple distinct optimal policies.

In system 100, the MDP model 110, receives as an input domain specific heuristics and the parameters of the heuristics, a state space and an action space for the heuristics and the parameters of the heuristics and an immediate cost defined per state and action. An immediate cost is defined for each state and action. According to some embodiment of the present disclosure, the domain specific heuristic and the parameters of the heuristic are defined as actions in the action space. According to some embodiment of the present disclosure, the input is received for example, from a user (usually a domain expert), which operates the system, through a user interface. In another example, the input is received from a storage, which comprises the required data about the domain specific heuristics, action space, state space and the immediate cost. In addition, the MDP receives transition probabilities (of states under actions) calculated from for example a set of records of real environmental data. Another option to obtain this data records is by executing a domain specific simulation by a processor. Once the transition probabilities are calculated, an estimated transition probability matrix is generated by a processor executing a code generating an estimated transition probability matrix. The method of generating an estimated transition probability matrix should be understood by a person of skill in the art and is not described herein. The transition probability matrix generation may be referred to as a training part of the MDP model, which does not include a traditional training part of training a machine learning model.

The MDP model 110 is executed with the generated transition probability matrix, action space, state space, immediate cost and domain specific heuristics and input parameters thereof, by a processor 111 to provide an optimal policy of an optimal mapping of a given state to an action, and one selected domain specific heuristic with input parameters of the selected heuristic. The optimal policy and the selected domain specific heuristic with its input parameters are inputted to a target machine 120, executing an iterative target computational process, which is being optimized in each iteration. The target machine 120 includes a processor, which executes a code of a plurality of algorithms using the provided optimal policy and domain specific heuristic and input parameters of the heuristic, to solve a predefined real-time large-scale optimization problem. The results of the algorithms includes for example the number of iteration, the received values for a predefined objective function of the optimal policy, the heuristic used in the iteration, the values received for the parameters of the heuristic used in the iteration and the calculated next state received after executing the MDP provided optimal policy.

The target computational process executed by the processor of target machine 120 outputs to the MDP model 110, the next state received after executing the optimal policy with the current state and the domain specific heuristic with parameters of the heuristic. The MDP model 110 provides the optimal action for the next state for the next iteration according to the optimal policy, where an updated domain specific heuristic and input parameters for the heuristic are received as part of the updated optimal action received for the next state. The MDP model stops providing an updated optimal action when a predefined sopping condition is met. For example, a stopping condition may be a predefined number of iterations that were executed, or when there is no change in the objective function defined for the optimal policy for a predefined number of iterations (e.g., there is no change in the objective function for three iterations). Another example may be a stopping condition in which, there is no change in the results of one or more input parameters of the selected heuristic for a predefined number of iterations (e.g., there is no change in the results of one or more input parameters for three iterations).

Figure 2:
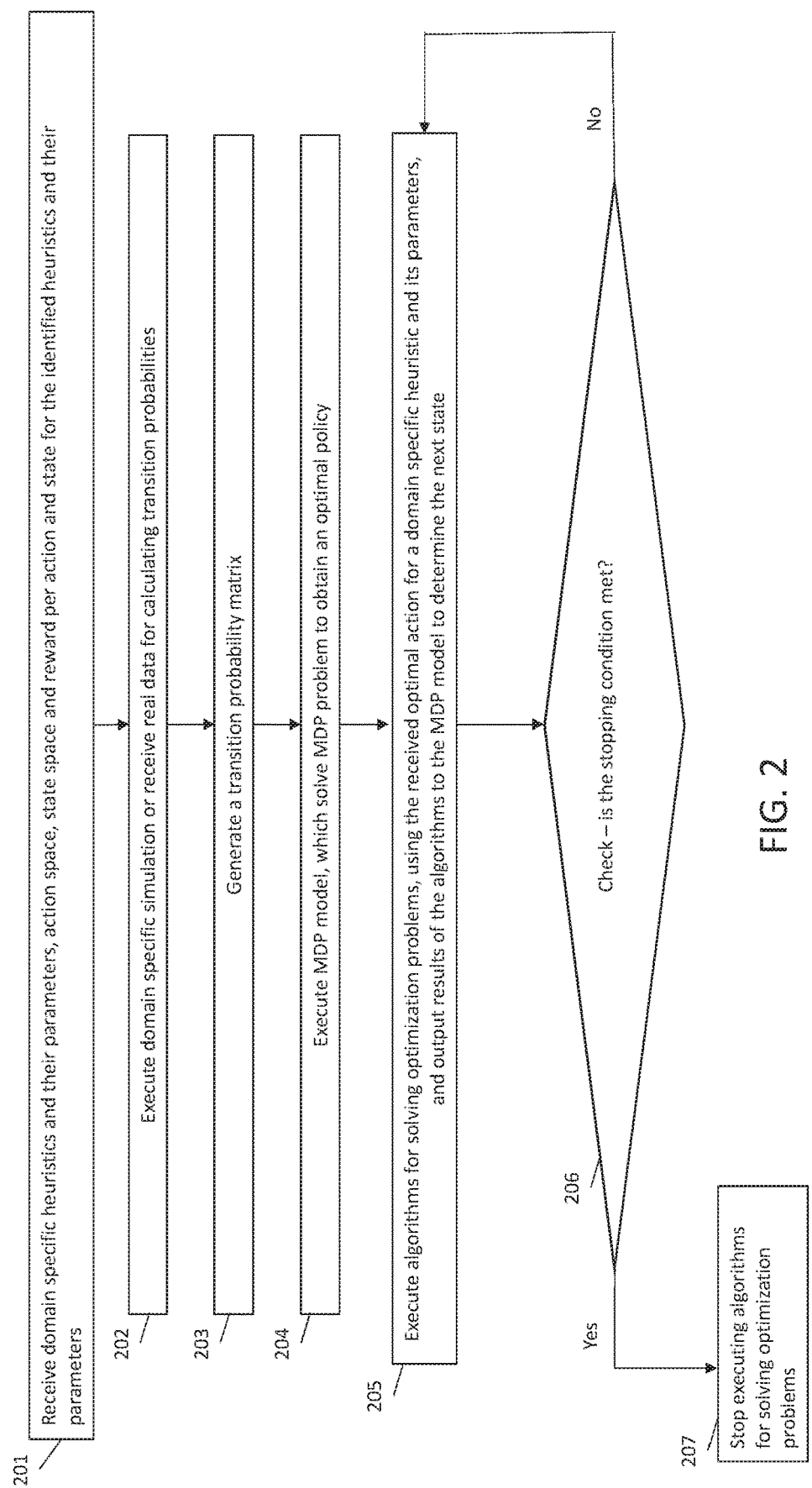
FIG. 2 schematically shows a flowchart of a method for optimizing the operation of a machine for solving real time large scale offline problems, according to some embodiments of the present disclosure.

Referring now to FIG. 2, this figure schematically shows a flowchart of a method for optimizing the operation of a machine for solving real time large scale off line optimization problems, according to some embodiment of the present disclosure. At 201, domain specific heuristics and input parameters thereof are received as an input for the MDP model 110. The input parameters of each heuristic may be different, and they are dependent on the heuristic used and the definition of the algorithms of the heuristic. Examples for heuristics may be the cruncher heuristic, which is a heuristic for improving a solution in big Mixed Integers Linear Programming (MILP) problems by fixing and unfixing assigned and unassigning integer variables iteratively. Another example for a heuristic is the Feasibility heuristic, which finds a feasible solution for MILP problems. In addition to the domain specific heuristics with their input parameters, an action space, a state space and immediate cost per action and state are also received as an input for the MDP model executed by processor 111.

According to some embodiment of the present disclosure, the domain specific heuristics and their input parameters are defined as a part of the action space and state space. The received input of the domain specific heuristics and their parameters, action space, state space and immediate cost may be defined by a user (usually an expert operating the system 100 of the present disclosure), according to some embodiment of the present disclosure. Another option is that the received input is stored in a storage, which comprises this data.

At 202, according to some embodiments of the present disclosure, all possible transition probabilities are calculated, for example by a simulation, which is executed by a processor to receive a graph of all possible transitions of states by all possible actions. According to certain embodiments of the present disclosure, instead of executing a simulation for receiving the graph of all possible states, a set of records of real environmental data is used and is received as an input and the transition probabilities are calculated from the received set of data.

At 203, after the graph of states is calculated, a processor executes a code for generating an estimated transition probability matrix based on the graph calculated from the received set of records.

Then, at 204, the action space, state space, immediate cost per action and state, transition probability matrix and domain space heuristic are used by the MDP model. The MDP model is executed by processor 111, to provide an optimal policy of an optimal mapping of a given state to an action to.

According to some embodiment of the present disclosure, the MDP model selects one heuristic from the domain specific heuristics as part of the actions in the optimal policy, so that for each action a domain specific heuristic selected by the MDP model is defined. The optimal action for a current state, which also may define a domain specific heuristic selected by the MDP model as part of the optimal action is outputted to be used by target machine 120, which executes iteratively a target computational process, which is being optimized.

At 205, a processor of target machine 120 executes a code of a plurality of algorithms using the provided optimal policy and the selected domain specific heuristic and input parameters of the heuristic, to solve a predefined real-time large-scale optimization problem. The results of the executed algorithms are outputted by the target computational process to the MDP model 110, with the calculated next state received after executing the optimal action for the current state, with the selected domain specific heuristic with the input parameters of the heuristic.

At 206, According to some embodiments of the present disclosure, the MDP model 110 checks a stopping condition, which is predefined according to the domain specific heuristic. At 206, as long as the stopping condition is not met (206:NO), the MDP model 110 provides an optimal action updated for the next state, received from target machine 120, according to the optimal policy outputted. One selected domain specific heuristic and input parameters for the heuristic are defined as part of the optimal action, for the next iteration of the algorithms executed by the target machine 120. If the stopping condition is met (206:YES), then at 207, the MDP model stops providing an updated optimal action and the execution of the algorithms by target machine 120 stops.

According to some embodiments of the present disclosure, the stopping condition may be for example no improvement or no change in the result of the objective function defined for the optimal policy, for a predefined number of iterations. In this case, the MDP model compares the results of the objective function of the current iteration to the results of the objective function of the previous iterations. When there is a change (usually an improvement) in the results of the objective function, the algorithms executed by the target machine 120 are executed again. However, when there is no change of the result for a predefined number of iterations (e.g., three iterations), the MDP model stops providing an updated optimal action for the next state and the execution of the algorithms by the target machine 120 stops. Another example for a stopping condition may be no change in the results of one or more of the input parameters of the domain specific heuristic. When there is a change (usually an improvement) in the results of the one or more parameters of the domain specific heuristic, the algorithms executed by the target machine 120 are executed again, else when there is no change of the result for a predefined number of iterations (e.g. 3 iterations), the MDP model stops providing an updated optimal action and the execution of the algorithms by the target machine 120 stops. A further example for a stopping condition may be a predefined number of iterations. Once the predefined number of iterations are completed the execution of the algorithms by the target machine 120 stops.

According to some embodiments of the present disclosure, the same MDP model is executed for all domain specific heuristics received. According to some other embodiments of the present disclosure, a separate MDP model is executed for each domain specific heuristic.

FIG. 3 schematically shows a simplified example of results received from the execution of the algorithms by target machine 120, executing an iterative target computational process, which is being optimized, according to some embodiments of the present disclosure. In the example, the results are received as a table listing the number of iteration, the result of the objective function and the results of the input parameters #1, #2 and #3. Parameters #1, #2 and #3 are defined according to the executed heuristic selected by the MDP model in each iteration, and they change among the different heuristics. The results of the objective function, x, x+y and x+y+z are improved in every iteration, and in some embodiments, they may be increased, so that y and z are bigger than zero, in case the objective function is defined to be a maximization problem. In some other embodiments, the results of the objective function may be decreased so that the y and z are smaller than zero in case the objective function is defined to be a minimization problem.

In some embodiments of the present disclosure, the results for the parameters #1, #2 and #3 may increase as shown for parameter #1, or decrease as shown for parameter #2, depending on the definition of each parameter, and according to the domain specific heuristic executed.

According to some embodiments of the present disclosure, a reinforcement learning (RL) model and/or a deep reinforcement learning (DRL) model is used instead of or together with the MDP model. In case the RL and/or DRL model is used together with the MDP model, and further to the MDP model execution, the MDP results, (i.e. the MDP optimal policy) are used as input for pre-training the RL and/or DRL model. The pre-training enables to execute the RL and/or DRL model to receive basic and/or partial results before training the model, which may take much longer time. The RL and/or DRL model is then executed, to output a "recommended policy" (which is similar to the optimal policy outputted by the MDP model but may be differently represented, for example by a deep neural network or a table), and to select one of the plurality of the domain specific heuristic and the input parameters thereof. The domain specific heuristic and its input parameters may be defined as a part of the action space received as an input, as shown in the method of FIG. 2, at 201. The output of the RL and/or DRL model of the recommended policy and the one selected domain specific heuristic, is used as an input for the target machine 120, which includes a processor executing an iterative target computational process, which is being optimized. The processor of target machine 120, executes the algorithms for solving the predefined optimization problem. The results of the execution of the algorithms including the calculated next state received after the execution are inputted into the RL and/or DRL model, which checks when a predefined stopping condition is met. In case the stopping condition is not met, the RL and/or DRL model provides a recommended action updated to the next state received from the previous iteration of the target machine 120. One selected domain specific heuristic and its input parameters are defined as part of the updated action for the next iteration of the algorithms executed by the target machine 120. Else, when the stopping condition is met, the execution of the algorithms by the processor of the target machine 120 stops. According to some embodiments of the present disclosure, the results of the algorithms executed by the processor of target machine 120 includes a next state, according to which the recommended action for the next iteration is determined based on the recommended policy.

Optionally, the RL and/or DRL model is executed instead of the MDP model. This means that an RL and or DRL model is executed instead of the MDP model. In this case, instead of receiving an immediate cost per each action and state as an input at 201, a reward is received per each action and state. In this case, the objective is to get the higher reward in total of the recommended policy received after the execution of the RL and/or DRL model.

In addition, when a DRL model is used, the training of the DRL model may be referred to as estimating parameters of the deep neural network matrix of the DRL model. The estimation of the parameters of the deep neural network is done using data records generated from the execution of a simulation by a processor, or in another case using a set of records of real environmental data.

According to some embodiments of the present disclosure, a computer program product for improving a machine operation is disclosed. The computer program product includes: one or more computer readable storage media, and program instructions collectively stored on the one or more computer readable storage media, the program instructions comprising: program instructions to receive a plurality of domain specific heuristics and a set of states, set of actions, an immediate cost and/or reward per a pair of state, and action and generating a graph of state transitions per actions and/or generating a transition probability matrix; program instructions to execute a Markov Decision Process (MDP) model for solving a MDP problem, outputting an optimal policy of an optimal mapping of a given state to an action; program instructions to select one of the plurality of domain specific heuristics and the heuristic input parameters based on the outcomes of a previous iteration; program instructions to control a machine for solving a predefined optimization problem in a plurality of execution iterations, wherein in each execution of an iteration: using the selected heuristic and the heuristic input parameters based on the outcomes of a previous iteration and the outputted MDP policy for a current state; receiving a result for the optimization problem and calculating a next state; checking when a predefined stopping condition is met, stopping the execution of the iterations of the machine for solving the predefined optimization problem; otherwise inputting the next state to the MDP model to receive the optimal action for the next state, for the next iteration of the machine for solving a predefined optimization problem.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

It is expected that during the life of a patent maturing from this application many relevant methods and systems for optimizing the operation of a machine for solving real time large scale off line optimization problems will be developed and the scope of the term methods and systems for optimizing the operation of a machine for solving real time large scale offline optimization problems, is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the present disclosure, which are, for clarity, described in the context of separate embodiments, may also be provided in combination in a single embodiment. Conversely, various features, which are, for brevity, described in the context of a single embodiment, may also be provided separately or in any suitable sub combination or as suitable in any other described embodiment. Certain features described in the context of various embodiments are not to be considered essential features of those embodiments, unless the embodiment is inoperative without those elements.

The descriptions of the various embodiments of the present disclosure have been presented for purposes of illustration, but they are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for improving a machine operation, the method comprising:
    receiving a plurality of domain specific heuristics, a set of states, and a set of actions, where an immediate cost and/or reward is associated with a pair of state and action, the domain specific heuristics including at least one of cruncher heuristics and feasibility heuristics;
    generating at least one of:
        a graph of state transitions for the actions, and
        a transition probability matrix;
    executing a Markov Decision Process (MDP) model for solving an MDP problem, and outputting an MDP optimal policy of an optimal mapping of a given state to an action, wherein the executing of the MDP includes executing an objective function for a plurality of MDP execution iterations until meeting an MDP stopping condition that includes no change in the results of input parameters of the domain specific heuristics;
    using the MDP optimal policy as input to pre-train a reinforcement learning (RL) model and/or deep RL (DRL) model, wherein the MDP optimal policy reduces an amount of time required to pre-train the RL model and/or DRL model;
    executing the pre-trained RL model and/or DRL model to obtain a recommended policy;
    selecting one of the plurality of domain specific heuristics and heuristic input parameters of the recommended policy;
    controlling the machine for solving a predefined optimization problem in a plurality of execution iterations, the predefined optimization problem selected from the group consisting of a mixed integer linear programming problem and a mixed integer programming problem, wherein each execution iteration includes:
  using an outputted RL and/or DRL recommended action for a current state which includes the selected domain specific heuristic and its input parameters;
  receiving a result for the optimization problem and calculating a next state;
  upon the RL and/or DRL model determining that a predefined stopping condition is met, stopping the execution iterations of the machine for solving the predefined optimization problem;
  upon the RL and/or DRL model determining that the predefined stopping condition has not been met, inputting the next state to the RL and/or DRL model to receive an optimal action for the next state for a next iteration of the machine for solving the predefined optimization problem.

2. The method of claim 1, wherein the domain specific heuristics and the heuristic input parameters thereof are defined as actions in an action space.

3. The method of claim 1, wherein a separate MDP model is executed for each domain specific heuristic and the heuristic input parameters thereof.

4. The method of claim 1, wherein the state transitions per action are generated by a simulation executed by a processor.

5. The method of claim 1, wherein the state transitions per action are generated from a set of real data received as input records.

6. The method of claim 1, wherein the stopping condition is one of the following:
  a predefined number of iterations;
  no change in a predefined objective function for the predefined number of iterations; and
  no change in one or more input parameters of the selected domain specific heuristic for the predefined number of iterations.

7. The method of claim 1, further comprising training the RL and/or Deep RL model with data records received from simulation results.

8. The method of claim 1, further comprising training the RL and/or Deep RL model with data records received from a set of real environmental data.

9. A system for improving a machine operation, the system comprising:
  one or more computer readable storage media with program instructions collectively stored on the one or more computer readable storage media; and
  one or more processors configured to execute the program instructions to perform a method comprising:
  receiving a plurality of domain specific heuristics, a set of states, and a set of actions, where an immediate cost and/or reward is associated with a pair of state and action, the domain specific heuristics including at least one of cruncher heuristics and feasibility heuristics;
  generating at least one of:
    a graph of state transitions for the actions, and
    a transition probability matrix;
  executing a Markov Decision Process (MDP) model for solving an MDP problem, and outputting an MDP optimal policy of an optimal mapping of a given state to an action, wherein the executing of the MDP includes executing an objective function for a plurality of MDP execution iterations until meeting an MDP stopping condition that includes no change in the results of input parameters of the domain specific heuristics;
  using the MDP optimal policy as input to pre-train a reinforcement learning (RL) model and/or deep RL (DRL) model, wherein the MDP optimal policy reduces an amount of time required to pre-train the RL model and/or DRL model;
  executing the RL model and/or DRL model to obtain a recommended policy;
  selecting one of the plurality of domain specific heuristics and heuristic input parameters of the recommended policy;
  controlling the machine for solving a predefined optimization problem in a plurality of execution iterations, the predefined optimization problem selected from the group consisting of a mixed integer linear programming problem and a mixed integer programming problem, wherein each execution iteration includes:
    using an outputted RL and/or DRL recommended action for a current state which includes the selected domain specific heuristic and its input parameters;
    receiving a result for the optimization problem and calculating a next state;
    upon the RL and/or DRL model determining that a predefined stopping condition is met, stopping the execution iterations of the machine for solving the predefined optimization problem;
    upon the RL and/or DRL model determining that the predefined stopping condition has not been met, inputting the next state to the RL and/or DRL model to receive an optimal action for the next state for a next iteration of the machine for solving the predefined optimization problem.

10. The system of claim 9, wherein the domain specific heuristics and the heuristic input parameters thereof are defined as actions in an action space.

11. The system of claim 9, wherein a separate MDP model is executed for each domain specific heuristic and the heuristic input parameters thereof.

12. The system of claim 9, the method further comprising training the RL and/or Deep RL model with data records received from simulation results.

13. System of claim 9, the method further comprising training the RL and/or Deep RL model with data records received from a set of real environmental data.

14. A computer program product for improving a machine operation, the computer program product comprising:
  one or more non-transitory computer readable storage media, and program instructions collectively stored on the one or more computer readable storage media, the program instructions comprising:
  program instructions to receive a plurality of domain specific heuristics, a set of states, and a set of actions, where an immediate cost and/or reward is associated with a pair of state and action, the domain specific heuristics including at least one of cruncher heuristics and feasibility heuristics;
  program instructions to generate at least one of:
    a graph of state transitions for the actions, and
    a transition probability matrix;
  program instructions to execute a Markov Decision Process (MDP) model for solving an MDP problem, and outputting an MDP optimal policy of an optimal mapping of a given state to an action, wherein the executing of the MDP includes executing an objective function for a plurality of MDP execution iterations until meeting an MDP stopping condition that includes no change in the results of input parameters of the domain specific heuristics;

program instruction to use the MDP optimal policy as input to pre-train a reinforcement learning (RL) model and/or deep RL (DRL) model, wherein the MDP optimal policy reduces an amount of time required to pre-train the RL model and/or DRL model;

executing the pre-trained RL model and/or DRL model to obtain a recommended policy;

program instructions to select one of the plurality of domain specific heuristics and heuristic input parameters of the recommended policy based on outcomes of a previous iteration;

program instructions to control the machine for solving a predefined optimization problem in a plurality of execution iterations, the predefined optimization problem selected from the group consisting of a mixed integer linear programming problem and a mixed integer programming problem, wherein each execution iteration includes:

using an outputted RL and/or DRL recommended action for a current state which includes the selected domain specific heuristic and its input parameters;

receiving a result for the optimization problem and calculating a next state;

upon the RL and/or DRL model determining that a predefined stopping condition is met, stopping the execution iterations of the machine for solving the predefined optimization problem;

upon the RL and/or DRL model determining that the predefined stopping condition has not been met, inputting the next state to the RL and/or DRL model to receive an optimal action for the next state for a next iteration of the machine for solving the predefined optimization problem.

15. The computer program product of claim 14, wherein the domain specific heuristics and the heuristic input parameters thereof are defined as actions in an action space.

* * * * *